United States Patent

Dainin

[11] 3,953,089
[45] Apr. 27, 1976

[54] PRESS FIT BEARING

[75] Inventor: Susumu Dainin, Higashiosaka, Japan

[73] Assignee: Maruzen Sewing Machine Co., Ltd., Moriguchi, Japan

[22] Filed: Dec. 11, 1974

[21] Appl. No.: 531,552

[30] Foreign Application Priority Data
Dec. 18, 1973 Japan.............................. 48-146015

[52] U.S. Cl............................. 308/237 R; 308/240
[51] Int. Cl.²................. F16C 17/02; F16C 27/02; F16C 33/10; F16C 33/66
[58] Field of Search................ 148/11.5 P; 308/121, 308/237 R, 237 A, 152, 240; 408/241

[56] References Cited
UNITED STATES PATENTS

| | | | |
|---|---|---|---|
| 1,612,205 | 12/1926 | Muth | 408/241 |
| 2,614,896 | 10/1952 | Pierce, Jr. | 308/152 X |
| 2,706,693 | 4/1955 | Haller | 308/237 R X |
| 2,881,511 | 4/1959 | Boegehold | 148/11.5 P X |
| 3,074,768 | 1/1963 | Abel | 308/240 X |
| 3,583,778 | 6/1971 | Mori | 308/240 X |
| 3,704,048 | 11/1972 | Yoshikawa et al. | 308/237 X |
| 3,829,184 | 8/1974 | Cherret | 308/237 R |

*Primary Examiner*—Albert J. Makay
*Assistant Examiner*—Howard Beltran
*Attorney, Agent, or Firm*—Arnstein, Gluck, Weitzenfeld & Minow

[57] ABSTRACT

A cylindrical bearing formed of an alloy of powdered metal and arranged to be press fitted into a bearing mounting. The bearing includes a body having an axial bore and is provided between the bore and the periphery thereof with a plurality of circumferentially spaced longitudinally extending through passages arcuate in cross section and concentric with the bore. The body portions outwardly adjacent said arcuate passages are resiliently deformable when the bearing body is pressed into a mounting.

4 Claims, 3 Drawing Figures

PRESS FIT BEARING

BACKGROUND OF THE INVENTION

This invention relates to a shaft bearing formed of an alloy of powdered metal and including a body having an axial bore to receive a shaft, and a plurality of spaced longitudinally extending through passages to contain a reservoir of lubricant.

SUMMARY OF THE INVENTION

One of the objects of this invention is the provision of a shaft bearing having a compressively deformable body which is adapted to be press fitted into a bearing mounting and which when so fitted does not transmit the compressive stresses to the bearing surface.

Another object of this invention is the provision of a shaft bearing having a plurality of longitudinally extending through passages containing a supply of lubricant to afford lubrication to the bearing surface for extended periods of time.

A further object of this invention is the provision of a shaft bearing having a plurality of longitudinally extending through passages and formed by powdered metallurgy techniques, thereby eliminating machining procedures and reducing the cost of fabrication of the same.

Other and further objects and advantages of this invention will become apparent from the following description when the same is considered in connection with the accompanying drawings.

DESCRIPTION OF A PREFERRED EMBODIMENT

Figure 1:
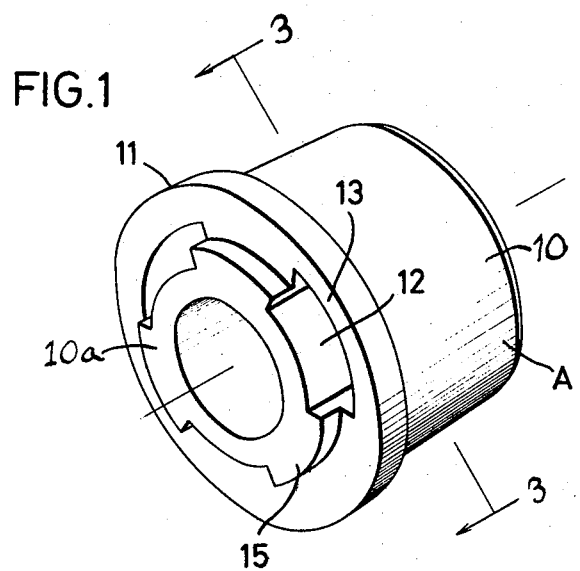
FIG. 1 is a perspective view of a shaft bearing, in accordance with the present invention.
Figure 2:
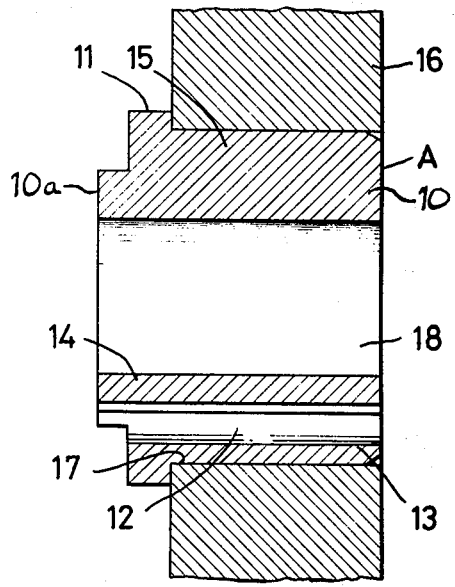
FIG. 2 is a longitudinal cross-sectional view, on an enlarged scale, showing the bearing received in a mounting.

Referring to the drawings, a shaft bearing A, in accordance with my invention, is formed of a powdered metal alloy and comprises a cylindrical body 10 provided at its forward end with a flange 11 and an axial bearing bore 18. Projecting forwardly of the flange 11 is a reduced body portion 10a. The body 10 is provided with three passages 12 equi-angularly spaced and extending fully through the body. Each of the passages 12 is arcuate in cross-section, concentric with the bore 18 and disposed substantially medially between the bore 18 and the outer periphery of the body 10.

Figure 3:
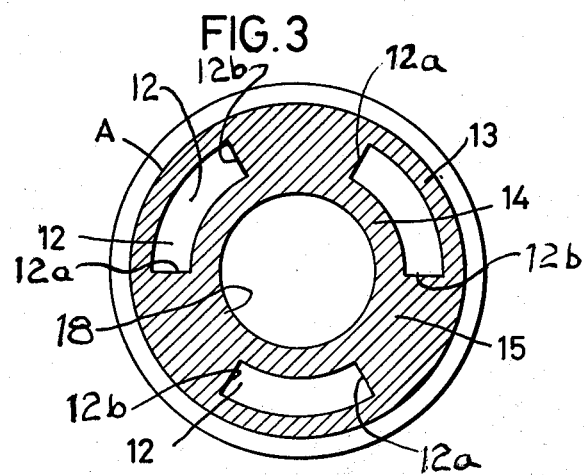
FIG. 3 is a cross-sectional view taken substantially on line 3—3 of FIG. 1.

Accordingly, as viewed in FIG. 3, there are three angular body sections occupied by the passages 12, with each passage being disposed between an inner wall portion 14 and an outer wall portion 13 and separated by intermediate solid angular body sections 15. Preferably, each outer wall portion 13 has a thickness less than that of the inner wall portion 14, and the combined thickness of wall portions 13 and 14 is less than one-half of the thickness of section 15 in a radial direction. Also, the combined arcuate lengths of the passages 12, as viewed in FIG. 3, is greater than the combined lengths of corresponding arcs on sections 15 lying on an imaginary annulus passing through the arcs of passages 12. As seen clearly in FIG. 3, the end walls 12a and 12b of adjacent passages 12 are disposed in diametric registration. Thus, end wall 12a of one passage 12 and end wall 12b of an adjacent passage will lie on a diametral line passing through the axis of bore 18.

The bearing A is intended to be press fitted into the receiving opening 17 of an appropriate mounting 16 which, for example, may comprise an arm of a sewing machine. The internal diameter of the opening 17 should be slightly smaller than the outer diameter of the body portion 10, in accordance with accepted practices, so that when the parts are assembled in press fitted relation the body 10 is caused to be compressed and the opening 17 slightly enlarged.

As was hereinabove noted, the three wall portions 13 constitute the thinnest wall sections of the body 10 and, therefore, are more likely to be subject to inward deformation than the solid wall sections 15 when stressed. Thus, when subjected to compressive stresses, as when the body 10 is press fitted into the mounting opening 17, deformation of the wall portions 13 will have substantially no distortive effect on the bearing bore 18, since the thick wall sections 15 provide the required stability for maintaining the precision of the bearing bore 18 to receive the shaft, not shown.

The bearing body 10 formed of powdered metal alloy may be fabricated with a desired porosity and impregnated with a suitable lubricant to constitute an "oilless" or self-lubricating bearing. Passages 12 may be filled with a suitable lubricant to provide a relatively large reserve of lubricant which over an extended period of time will percolate through the pores into the surface of the bore 18 and which will be effective to maintain proper lubrication of the bearing for a long extended period of service. It will be understood that suitable conventional end seals, not shown, may be provided to contain the lubricant in the passages 12.

While three through passages 12 are shown in the preferred embodiment, it will be understood that a bearing, in accordance with my invention, may embody a greater number than three and function effectively.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. A shaft bearing comprising a cylindrical body adapted to be received in a bearing mounting, said body having an axial bore to receive a shaft and having a plurality of equi-angularly spaced passages extending longitudinally through said bore with solid body portions being disposed intermediate adjacent and between passages and each passage being diametrically opposite a substantially equi-angular solid body portion, each of said passages being disposed radially outwardly of said bore and intermediate said bore and the periphery of said body, each passage being arcuate in transverse cross section and located on a common annulus concentric with said bore, the thickness of a body portion disposed outwardly of a passage being less than the thickness of a body portion disposed inwardly of said passage, said outwardly disposed body portions being deformable radially inwardly in response to compressive forces acting on said cylindrical body when received in a bearing mounting.

2. The invention as defined in claim 1 in which the end walls of said arcuate passages lie on radial lines, the center of which is the axis of the bore and in which the remotely disposed end walls of adjacent passages are in diametral registration.

3. The invention as defined in claim 1 in which the body is formed of a powdered metal alloy and is porous.

4. The invention as defined in claim 3 in which the passages contain a lubricant.

* * * * *

UNITED STATES PATENT OFFICE
CERTIFICATE OF CORRECTION

PATENT NO. : 3,953,089
DATED : April 27, 1976
INVENTOR(S) : SUSUMU DAININ

It is certified that error appears in the above-identified patent and that said Letters Patent are hereby corrected as shown below:

On the Title Page, INID Number [73], after "Assignee:", cancel beginning with "Maruzen" to and including "Japan", and insert the following:

--1/2 interest to Maruzen Sewing Machine Co., Ltd., Moriguchi City, Osaka, and 1/2 interest to Dainin Kosakusho Co., Ltd., Higashiosako City, both of Japan.--

Signed and Sealed this

Thirty-first Day of August 1976

[SEAL]

*Attest:*

RUTH C. MASON
*Attesting Officer*

C. MARSHALL DANN
*Commissioner of Patents and Trademarks*